(12) United States Patent
Park et al.

(10) Patent No.: US 10,008,297 B2
(45) Date of Patent: Jun. 26, 2018

(54) NUCLEAR REACTOR EQUIPMENT TRANSFER APPARATUS

(71) Applicant: KOREA PLANT SERVICE & ENGINEERING CO., LTD., Naju (KR)

(72) Inventors: Min Su Park, Seongnam (KR); Dong Il Kim, Yongin (KR); Bae Jun Kang, Yongin (KR); Hong Seok Ryu, Yongin (KR); Jun Hong Kim, Yongin (KR); Youn Kyu Kim, Seoul (KR); Won Taik Lim, Yongin (KR)

(73) Assignee: KOREA PLANT SERVICE & ENGINEERING CO., LTD., Naju (KR)

(*) Notice: Subject to any disclaimer, the term of this patent is extended or adjusted under 35 U.S.C. 154(b) by 554 days.

(21) Appl. No.: 14/713,346

(22) Filed: May 15, 2015

(65) Prior Publication Data

US 2015/0332796 A1    Nov. 19, 2015

(30) Foreign Application Priority Data

May 15, 2014  (KR) .................. 10-2014-0058572

(51) Int. Cl.
*G21C 17/013*    (2006.01)
*G21C 19/20*    (2006.01)
(Continued)

(52) U.S. Cl.
CPC ............. *G21C 19/20* (2013.01); *G21C 17/00* (2013.01); *G21C 17/01* (2013.01); *G21C 17/013* (2013.01); *G21C 19/02* (2013.01)

(58) Field of Classification Search
CPC .... G21C 17/003; G21C 17/01; G21C 17/013; G21C 19/20; G21C 19/207
See application file for complete search history.

(56) References Cited

U.S. PATENT DOCUMENTS 3,780,571 A * 12/1973 Wiesener .................. B25J 5/00
                                                                         348/83
3,809,607 A *  5/1974 Murray ................. G21C 13/00
                                                                         376/249
(Continued)

FOREIGN PATENT DOCUMENTS

JP    H05-209864 A    8/1993
JP    H06-008809 B2   2/1994
(Continued)

*Primary Examiner* — Sharon M Davis (57) ABSTRACT

A management equipment transfer apparatus which transfers management equipment, which tests and maintains an inside of a nuclear reactor vessel, inside the nuclear reactor vessel while being locked to the management equipment and the nuclear reactor vessel, includes: a cross beam configured to be lengthily disposed inside the nuclear reactor vessel in a transverse direction; a rod configured to be connected to a cross beam lengthily disposed inside the nuclear reactor vessel in a longitudinal direction; a bracket configured to be mounted in the rod to fix the management equipment; an arm configured to extend toward an inner peripheral surface of the nuclear reactor vessel and be connected to the cross beam; and rolling parts configured to be disposed at ends of the arm and the cross beam, contact the inner peripheral surface of the nuclear reactor vessel, and rotatably support the cross beam and the arm.

14 Claims, 8 Drawing Sheets

(51) Int. Cl.
 *G21C 19/02* (2006.01)
 *G21C 17/01* (2006.01)
 *G21C 17/00* (2006.01)

(56) References Cited

U.S. PATENT DOCUMENTS

| | | | | |
|---|---|---|---|---|
| 4,505,874 | A * | 3/1985 | Warren | G21C 17/01 |
| | | | | 376/249 |
| 2013/0044849 | A1 * | 2/2013 | Hosoe | F22B 37/003 |
| | | | | 376/249 |
| 2015/0367507 | A1 * | 12/2015 | Egawa | G21D 1/003 |
| | | | | 248/327 |

FOREIGN PATENT DOCUMENTS

| | | |
|---|---|---|
| JP | 2000-321255 A | 11/2000 |
| JP | 2010-044015 A | 2/2010 |
| KR | 2008-0010731 A | 1/2008 |

\* cited by examiner

NUCLEAR REACTOR EQUIPMENT TRANSFER APPARATUS

CROSS-REFERENCE TO RELATED APPLICATION

This application is based on and claims the benefit of priority to Korean Patent Application No. 10-2014-0058572, filed on May 15, 2014 in the Korean Intellectual Property Office, the disclosure of which is incorporated herein in its entirety by reference.

TECHNICAL FIELD

The present disclosure relates to a management equipment transfer apparatus, and more particularly, to a management equipment transfer apparatus capable of easily installing and transferring management equipment independent of a size of a nuclear reactor vessel.

BACKGROUND

Generally, a nuclear reactor means an apparatus which controls a chain reaction to emit a large amount of mass defect energy which is instantly emitted as a result of a chain nuclear fission reaction so as to use heat energy generated from nuclear fission as power. To secure safety and reliability of an atomic power plant, there is a need to periodically test a pipe or a nuclear reactor vessel. The test is performed by ultrasonic testing, and the like which mainly uses an ultrasonic wave. A testing system and a maintenance system of the nuclear reactor vessel are installed using a fixed platform, in which the fixed platform is fixedly mounted to the nuclear reactor vessel by a multi-axis manipulator manner.

However, the fixed platform needs to include a separate bracket for adjusting a length when the size of the nuclear reactor vessel is increased. In addition, the fixed platform may not change the multi-axis manipulator which is attached to a lower end thereof, such that the number of nuclear reactors which may be tested is limited and the fixed platform may hardly be decomposed/assembled and transferred/installed.

RELATED ART DOCUMENT

Patent Document

Japanese Patent Laid-Open Publication No. 2000-321255

SUMMARY

The present disclosure has been made to solve the above-mentioned problems occurring in the prior art while advantages achieved by the prior art are maintained intact.

An aspect of the present disclosure provides a management equipment transfer apparatus capable of installing management equipment independent of a size of a nuclear reactor vessel.

Another aspect of the present disclosure provides a management equipment transfer apparatus capable of being replaced by required test and maintenance equipment depending on working conditions.

Still another aspect of the present disclosure provides a management equipment transfer apparatus capable of reducing a weight and a volume of management equipment.

Yet still another aspect of the present disclosure provides a management equipment transfer apparatus capable of automatically transferring management equipment.

According to an exemplary embodiment of the present disclosure, a management equipment transfer apparatus which transfers management equipment, which tests and maintains an inside of a nuclear reactor vessel, inside the nuclear reactor vessel while being locked to the management equipment and the nuclear reactor vessel includes: a cross beam configured to be lengthily disposed inside the nuclear reactor vessel in a transverse direction; a rod configured to be connected to a cross beam lengthily disposed inside the nuclear reactor vessel in a longitudinal direction; a bracket configured to be mounted in the rod to fix the management equipment; an arm configured to extend toward an inner peripheral surface of the nuclear reactor vessel and be connected to the cross beam; and rolling parts configured to be disposed at ends of the arm and the cross beam, contact the inner peripheral surface of the nuclear reactor vessel, and rotatably support the cross beam and the arm.

At least any one of the arm and the cross beam may be formed to be expanded and contracted in a length direction so as to control an interval between the rolling part and the nuclear reactor vessel.

An expansion and contraction direction of the arm or the cross beam may be a radius direction of the nuclear reactor vessel.

The rod may be coupled with the cross beam to move in an up and down direction of the nuclear reactor vessel.

The rod may be coupled with the bracket to move the bracket in an up and down direction of the nuclear reactor vessel.

The rod may be coupled with the cross beam to move the bracket in a transverse direction of the nuclear reactor vessel.

The rolling part may include: a roller configured to rotate by being supplied with power; and a wheel configured to rotate by a friction force with the nuclear reactor vessel.

The arm and the cross beam may be hinged with each other to control an angle at a connection point between the arm and the cross beam.

The bracket may detachably fix the management equipment.

The management equipment transfer apparatus may further include: a first actuator configured to supply power so as to expand and contract the arm or the cross beam; a second actuator configured to supply power so as to move the bracket in an up and down direction of the nuclear reactor vessel; and a third actuator configured to supply a rotating force to the rolling part.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Various advantages and features of the present disclosure and methods accomplishing thereof will become apparent from the following detailed description of embodiments with reference to the accompanying drawings.

However, the present disclosure is not be limited to the embodiments set forth herein but may be implemented in many different forms. The present embodiments may be provided so that the disclosure of the present disclosure will be complete, and will fully convey the scope of the disclosure to those skilled in the art and therefore the present disclosure will be defined within the scope of claims. Like reference numerals throughout the description denote like elements.

Hereinafter, a management equipment transfer apparatus according to exemplary embodiments of the present disclosure will be described with reference to the accompanying drawings.

Figure 1:
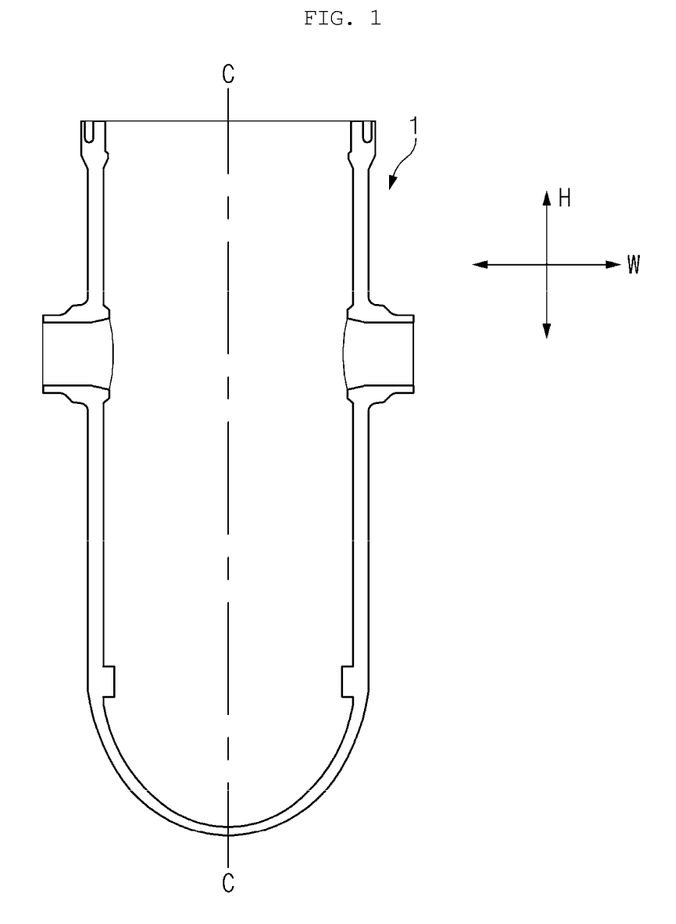
FIG. 1 is a longitudinal cross-sectional view of a nuclear reactor vessel according to an exemplary embodiment of the present disclosure.
Figure 2:
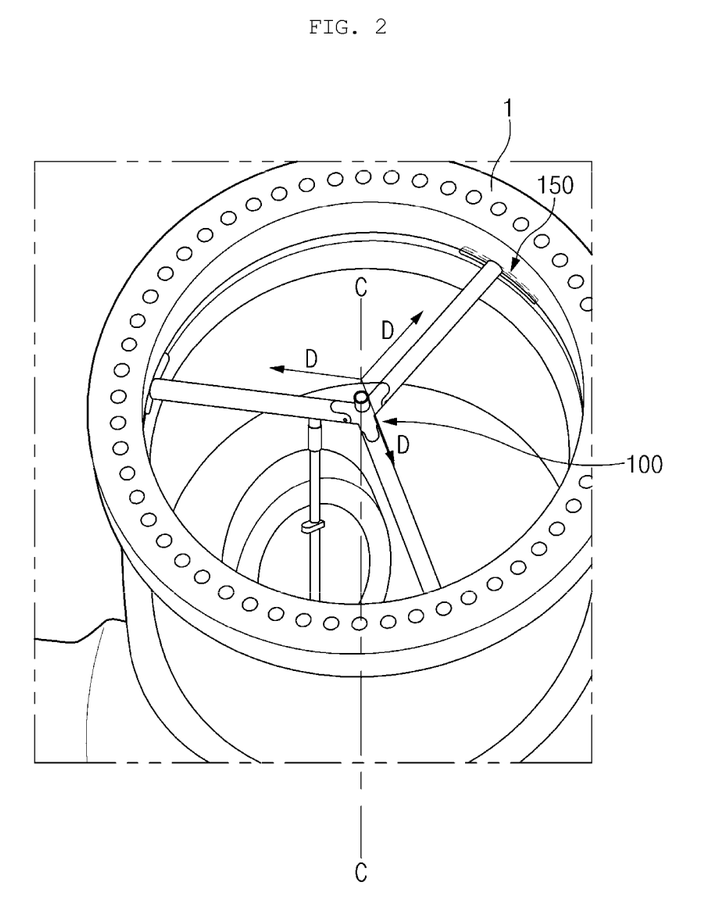
FIG. 2 is a perspective view of a management equipment transfer apparatus according to an exemplary embodiment of the present disclosure which is disposed in the nuclear reactor vessel.
Figure 3:
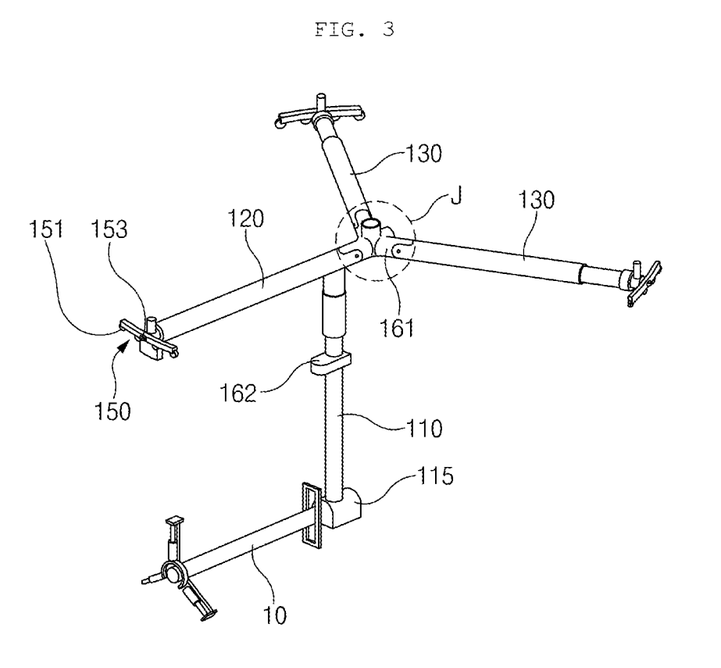
FIG. 3 is a perspective view of the management equipment transfer apparatus according to the exemplary embodiment of the present disclosure.
Figure 4:
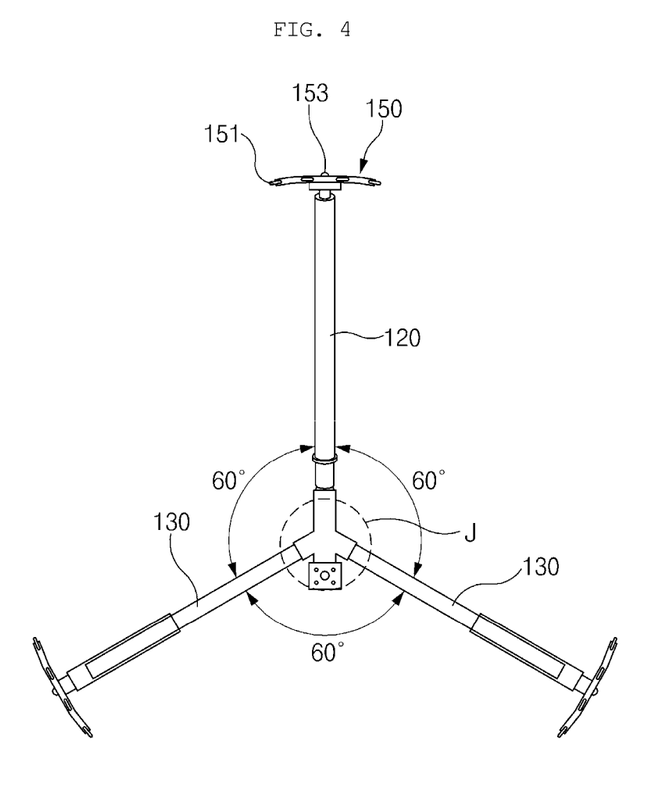
FIG. 4 is a plan view of the management equipment transfer apparatus according to the exemplary embodiment of the present disclosure.

FIG. 1 is a longitudinal cross-sectional view of a nuclear reactor vessel according to an exemplary embodiment of the present disclosure. FIG. 2 is a perspective view of a management equipment transfer apparatus according to an exemplary embodiment of the present disclosure which is disposed in the nuclear reactor vessel. FIG. 3 is a perspective view of the management equipment transfer apparatus according to the exemplary embodiment of the present disclosure. FIG. 4 is a plan view of the management equipment transfer apparatus according to the exemplary embodiment of the present disclosure.

Referring to FIGS. 1 to 4, a management equipment transfer apparatus 100 according to an exemplary embodiment of the present disclosure which transfers management equipment 10, which tests and maintains an inside of a nuclear reactor vessel 1, inside the nuclear reactor vessel 1 while being locked to management equipment 10 and the nuclear reactor vessel 1 includes: a cross beam 120 configured to be lengthily disposed inside the nuclear reactor vessel 1 in a transverse direction (W) which is the same as a radius direction (D) of the nuclear reactor vessel 1; a rod 110 configured to be connected to a cross beam 120 lengthily disposed inside the nuclear reactor vessel 1 in a longitudinal direction (H) which is the same as an up and down direction (H) of the nuclear reactor vessel 1; a bracket 115 configured to be mounted in the rod 110 to fix the management equipment 10; an arm 130 configured to extend toward an inner peripheral surface of the nuclear reactor vessel 1 and be connected to the cross beam 120; and rolling parts 150 configured to be disposed at ends of the arm 130 and the cross beam 120, contact the inner peripheral surface of the nuclear reactor vessel 1, and rotatably support the cross beam 120 and the arm 130.

The nuclear reactor uses mass defect energy which is generated as a result of nuclear fission reaction. Unlike a thermal power reactor which automatically expands combustion by combustion heat, the nuclear reactor performs the nuclear fission reaction using neutrons emitted at the time of nuclear fission of fuel as a medium.

The nuclear fission reaction of the nuclear reactor controls the number of neutrons absorbed into nuclear fuel to be able to control the combustion of nuclear fuel. To sustain the nuclear fission within the nuclear reactor, the number of neutrons, which is again absorbed into the nuclear fuel to again start the nuclear fission, among neutrons emitted at the time of the nuclear fission needs to be at least one. When the number of neutrons is 1, the nuclear fission reaction is not decreased and increased and is constantly kept, which is referred to as a critical of the nuclear reactor. Further, when the number of neutrons exceeds 1, the number of nuclear fission reactions is gradually increased, which is referred to as a supercritical state and the reverse case is a subcritical state.

A method for keeping the nuclear reactor in a critical state when the nuclear reactor is operated at a constant output or absorbing extra neutrons into a control rod when the nuclear reactor slightly exceeds the critical is used. The number of neutrons emitted at the time of one-time nuclear fission is 2 in average in the case of uranium 235, but all the neutrons do not contribute to the nuclear fission again but the number of neutrons is decreased due to leakage to an outside of the nuclear reactor, absorption into a nonnuclear fissionable material, and the like. Therefore, to continuously operate the nuclear reactor, it is important to minimize a loss of neutrons.

As a method for preventing the loss of neutrons, there are a method for increasing an absorption probability by increasing an amount of nuclear fissionable material or decelerating fast neutron emitted at the time of nuclear fission to a thermal neutron level, a method for sufficiently increasing a size of a nuclear reactor to minimize leakage to an outside of a reactor core, and a method for minimizing absorption into another nonnuclear fissionable material, and the like. The neutron emitted at the moment of the nuclear fission is less likely to be absorbed into nuclear fuel as the fast neutron having high energy and therefore it is important to increase the absorption probability by decelerating the fast neutron.

The neutron reactor is controlled by controlling the number of neutrons by putting or extracting a material having a large neutron absorption cross section such as cadmium and boron into or from the nuclear reactor core and is controlled by a method for changing an amount of reflector or moderator. The nuclear reactor vessel 1 accommodates a nuclear fuel rod and water. Here, the water is heat-exchanged to absorb energy generated by a nuclear fission reaction and thus is phase-changed to steam. The nuclear reactor vessel 1 needs to keep an airtight state and therefore a state of a wall surface needs to be tested. The testing of the nuclear reactor vessel 1 is performed by ultrasonic testing (VT, UT, PAUT, and the like) and the defective portion is performed by maintenance (cutting, machining, welding, and the like). The management equipment 10 includes at least one of ultrasonic testing equipment and maintenance equipment.

The bracket 115 is mounted with the management equipment 10 and is coupled with the rod 110 to be described below. The rod 110 fixes the bracket 115 and is disposed in a longitudinal direction. The rod 110 is disposed in the up and down direction (H) which is parallel to a longitudinal central line (C-C) of the nuclear reactor vessel 1. The cross beam 120 is disposed in a left and right direction. The cross beam 120 is disposed in the radius direction (D) which is orthogonal to the longitudinal central line C-C of the nuclear reactor vessel 1. The cross beam 120 supports a load of the rod 110 and the management equipment 10. The bracket 115 detachably fixes the management equipment 10 so that the management equipment 10 may be replaced. The bracket 115 may be disposed at an end of a lower portion of the rod 110. The bracket 115 may also be formed in a tong shape to fix the management equipment 10. Any one of the bracket 115 and the management equipment 10 is provided with a protrusion and the other one thereof is provided with an insertion into which the protrusion is inserted, and as a result, the bracket 115 and the management equipment 10 may be coupled with each other. The bracket 115 may also be screw-connected to the management equipment 10.

The arm 130 is connected to the cross beam 120. The arm 130 may extend in the same direction as a length direction of the cross beam 120 and may also be connected to the cross beam 120, while forming a tilt to the length direction of the cross beam 120. The arm 130 supports the load of the cross beam 120, the rod 110, and the management equipment 10.

The rolling part 150 is disposed to be rolled along an inner peripheral surface of the nuclear reactor vessel. The rolling part may be disposed at each of the ends of the arm 130 and the cross beam 120. The rolling part 150 changes sliding friction to rolling friction to reduce resistance generated at the time of the movement of the cross beam 120 and the arm 130. Therefore, a manager of the nuclear reactor vessel 1 may transfer the management equipment 10 with a smaller force. The cross beam 120 and the arm 130 may rotate, and thus the management equipment 10 and the rod 110 may rotate based on the longitudinal central line C-C of the nuclear reactor vessel 1.

At least any one of the arm 130 and the cross beam 120 may be expanded and contracted to control an interval between the rolling part 150 and the nuclear reactor vessel 1 in a length direction. The arm 130 and the cross beam 120 may be extended or reduced in a length direction. A length of the arm 130 and the cross beam 120 is differently adjusted depending on the size of the nuclear reactor vessel 1. The arm 130 and the cross beam 120 may include a cylinder and a piston. The arm 130 and the cross beam 120 may be extended until a contact area between the rolling part 150 and the nuclear reactor vessel 1 is maximized. When the operation of the management equipment 10 ends, the arm 130 and the cross beam 120 may be contracted in the length direction, thereby minimizing the volume of the management equipment 10. Therefore, the management equipment 10 may be easily transferred, installed, and stored.

The expansion and contraction direction of the arm 130 or the cross beam 120 may be the radius direction (D) of the nuclear reactor vessel 1. The rod 110 may be coupled with the cross beam 120 to move in an up and down direction (H) of the nuclear reactor vessel 1. The length direction of the arm 130 and the cross beam 120 is toward or passes through the longitudinal central line C-C of the nuclear reactor vessel 1. The nuclear reactor vessel 1 supports the load of the arm 130 and the cross beam 120 and therefore the arm 130 and the cross beam 120 are fixed to the nuclear reactor vessel 1 to be structurally stabilized. The length direction of the arm 130 and the cross beam 120 may be formed to be vertical to the contact surface of the nuclear reactor vessel 1.

Figure 5A:
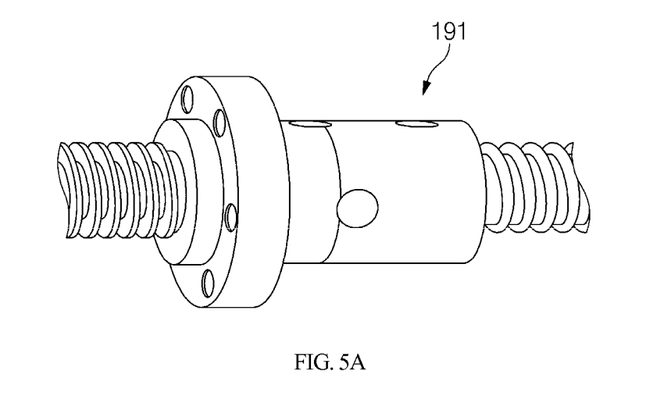
FIGS. 5A and 5B are perspective views of a ball screw and a lead screw according to the exemplary embodiment of the present disclosure.
Figure 5B:
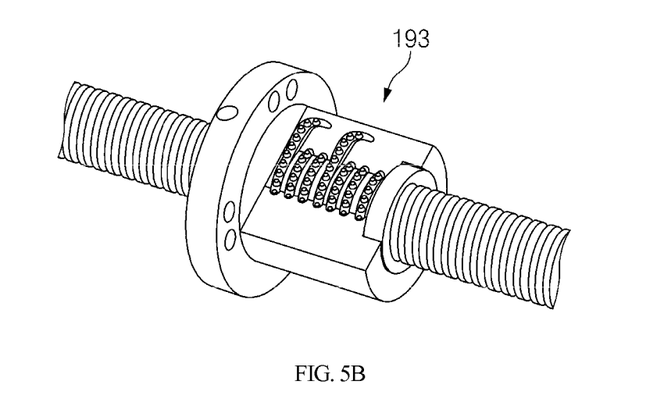

FIGS. 5A and 5B are perspective views of a ball screw and a lead screw according to the exemplary embodiment of the present disclosure.

Referring to FIGS. 5A and 5B, the rod 110 may be coupled with the bracket 115 to move the bracket 115 in the up and down direction (H) of the nuclear reactor vessel 1. The rod 110 itself may control the height of the bracket while moving vertically and the rod 110 is fixed to the cross beam 120 and only the bracket may vertically move in the length direction of the rod 110. A method for coupling the rod 110 with the cross beam 120 to vertically move the rod 110 may be various. As the example, the rod 110 includes the piston and the cylinder and the bracket may be coupled with the piston to adjust the height of the bracket depending on the insertion depth of the piston. As another example, the height of the bracket may be adjusted by the ball screw 193 or the lead screw 191.

The rod 110 may be coupled with the cross beam 120 to move the bracket 115 in the transverse direction (W) of the nuclear reactor vessel 1. A method for coupling the rod 110 with the cross beam 120 to move the rod 110 in the transverse direction (W) may be various. According to one exemplary embodiment, a rack may be provided in the length direction of the cross beam 120 in the cross beam 120 and a pinion rotating while being engaged with the rack may be disposed at the rod 110. A rotation shaft of the pinion may be vertically disposed to the length direction of the rod 110.

The rolling part 150 includes a roller 153 configured to receive power to rotate for oneself and a wheel 151 configured to rotate by a friction force with the nuclear reactor vessel 1. The roller 153 may be supplied with power from a third actuator 163. The third actuator 163 may be a motor. The rolling part 150 may include a roller which may rotate by the motor. The third actuator 163 and the roller 153 are coupled with each other by a direct connection type and thus a rotation shaft of the third actuator 163 and a rotation shaft of the roller 153 may be disposed on the same line. The rotation shaft of the third actuator 163 and the rotation shaft of the roller 153 may be connected to each other by a gear or a belt to be able transfer power. The rolling part 150 is disposed in plural and at least one of the plurality of rolling parts 150 includes the roller 153.

The arm 130 and the cross beam 120 may be hinged with each other to control an angle at a connection point (J) between the arm 130 and the cross beam 120. Since the arm 130 and the cross beam 120 may be hinged with each other, the arm 130 and the cross beam 120 are unfolded when being disposed in the nuclear reactor vessel 1 and when the examination and testing of the nuclear reactor vessel 1 end, the arm 130 and the cross beam 120 are folded to reduce the volume, thereby facilitating the storage and delivery. The cross beam 120 is connected to the rod 110 and therefore the cross beam 120 may be provided in a single number and the arm 130 may be provided in plural.

When the number of arms 130 is increased, the structural stability is increased. However, the weight and volume of the management equipment transfer apparatus 100 are increased and the storage thereof is inconvenient, such that the arm 130 may be configured in two. The two arms 130 and the cross beam 120 may be connected to each other, forming an angle of 60°.

The bracket 115 detectably fixes the management equipment 10. The manager may replace the management equipment 100 in a working order. For example, the ultrasonic testing equipment (VT, UT, PAUT, and the like) is fixed to the bracket 115 to perform the test and then finds out the defective portion and is replaced by the maintenance equipment (cutting, machining, welding equipment). The manager continuously performs the operation using the replaced equipment.

Figure 6:
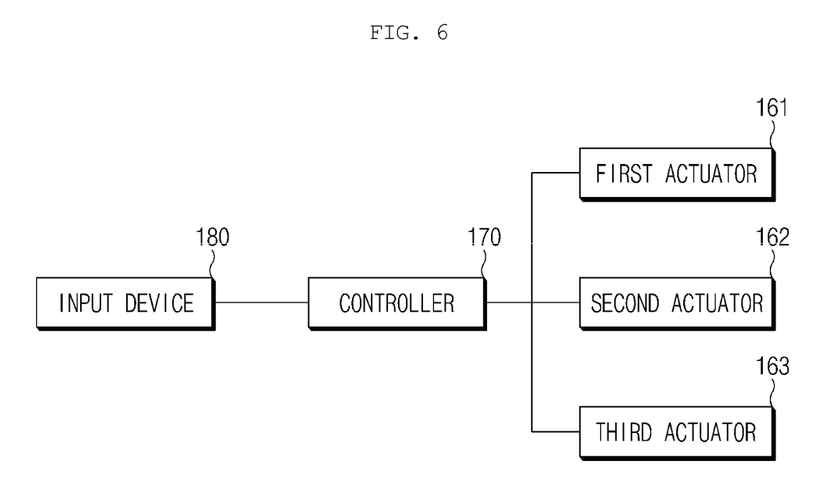
FIG. 6 is a block diagram of a controller according to the exemplary embodiment of the present disclosure and components therearound.

FIG. 6 is a block diagram of a controller according to the exemplary embodiment of the present disclosure and components therearound.

Referring to FIG. 6, the management equipment transfer apparatus 100 according to the exemplary embodiment of the present disclosure includes: a first actuator 161 configured to supply power so as to expand and contract the arm 130 or the cross beam 120; a second actuator 162 configured to supply power so as to move the bracket 115 in the up and down direction (H) of the nuclear reactor vessel 1; and the third actuator 163 configured to supply a rotating force to the rolling part 150.

The first actuator 161, the second actuator 162, and the third actuator 163 generate power using oil pressure, air pressure, or electric power and supply the generated power to each member. For example, the first actuator 161 may be a hydraulic apparatus which uses a fluid pressure like oil. The second actuator 162 and the third actuator 163 may be a motor which generates a rotating force using power. A rotation shaft of the motor may be directly connected to the rolling part 150 and may be indirectly connected to the rolling part 150, the bracket 115, and the rod 110 by the belt or the gear. The controller 170 generates a control signal which operates the first actuator 161, the second actuator 162, and the third actuator 163. The controller 170 is connected to an input device 180. The input device 180 is to input information to the controller 170. The input device 180 may be a keyboard, a mouse, a joystick, and the like. The manager operates the input device 180 to control an operation amount of the first actuator 161, the second actuator 162, and the third actuator 163. The controller 170 operates the input device 180 to transfer the position of the management equipment 10 to a desired place.

Figure 7:
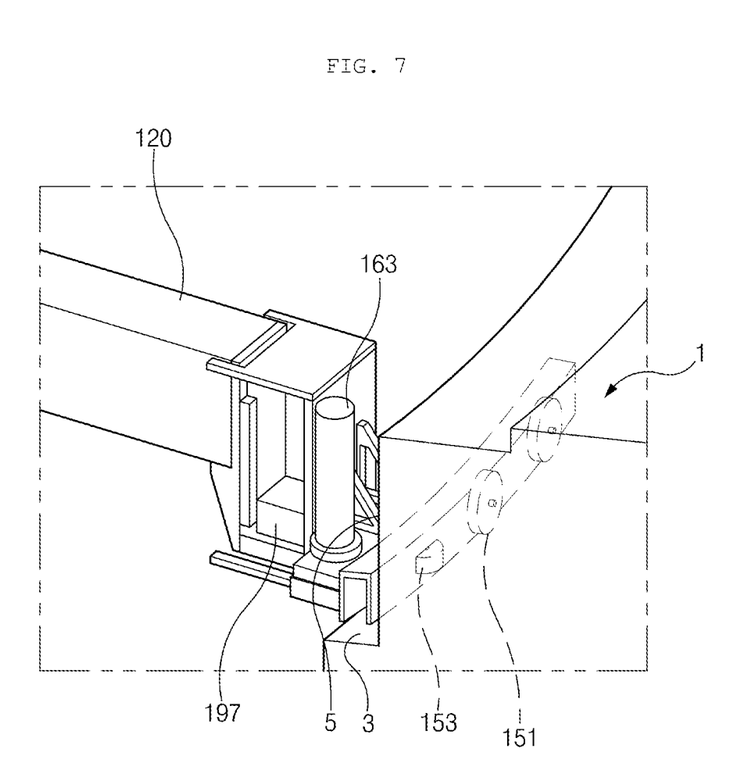
FIG. 7 is a diagram illustrating a disposition relationship of a rolling part according to an exemplary embodiment of the present disclosure.

FIG. 7 is a diagram illustrating a disposition relationship of a rolling part according to an exemplary embodiment of the present disclosure.

Referring to FIG. 7, the wheel 151 is disposed to be locked to a locking jaw 3 which is formed on an inner side wall 5 of the nuclear reactor vessel and the roller 153 is disposed to rotate, contacting the inner side wall 5 which is formed on the inner side wall 5 of the nuclear reactor vessel. The roller 153 is supplied with power from the third actuator 163 to rotate. The wheel 151 rotates by a friction force with the nuclear reactor vessel. A rotation shaft of the wheel 151 may be formed in the radius direction of the nuclear reactor vessel. The wheel 151 rotates, contacting the locking jaw 3 of the nuclear reactor vessel horizontally formed. The roller 153 rotates, contacting the inner side wall 5 of the nuclear reactor vessel which approximately vertically stands. The roller 153 is disposed so that the rotation shaft of the roller 153 longitudinally stands. When the roller 153 rotates, the management equipment transfer apparatus 100 rotates by the friction force of the roller 153 and the inner side wall. Therefore, a disposition angle of the management equipment 10 may be controlled. The arm 230 may be expanded and contracted in the radius direction of the nuclear reactor vessel and therefore the roller 153 may be extended until the roller 153 contacts the inner side wall 5 of the nuclear reactor vessel. Further, a roller support part 197 may move the roller 153 or the rolling part 150 until the roller 153 contacts the inner side wall 5 of the nuclear reactor vessel. The roller support part 197 is configured to include the cylinder and the piston and may be extended. A sufficient friction force is generated and thus the roller 153 contacts the inner side wall 5 of the nuclear reactor vessel to prevent an idle of the roller 153.

Figure 8:
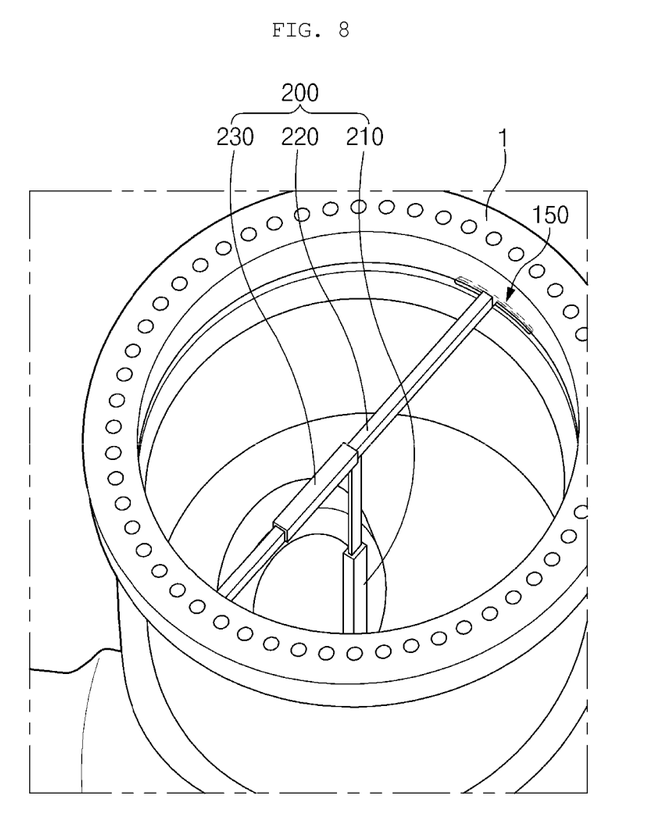
FIG. 8 is a perspective view of a management equipment transfer apparatus according to another exemplary embodiment of the present disclosure.

FIG. 8 is a perspective view of a management equipment transfer apparatus 200 according to another exemplary embodiment of the present disclosure.

Referring to FIG. 8, the cross beam 220 and the arm 230 may be connected to each other to form a straight line to have a length increased or decreased in one shaft direction. The cross beam 220 and the arm 230 may be formed in a three-leg form and a straight line. That is, any one of the cross beam 220 and the arm 230 is inserted into the other thereof and thus the overall length thereof may also be changed depending on the inserted degree. The overall length of the cross beam 220 and the arm 230 is changed depending on a diameter of the nuclear reactor vessel.

The exemplary embodiment of the present disclosure has at least one of the following effects.

First, it is possible to provide the transfer apparatus which may be expanded and contracted to be fitted for the size of the nuclear reactor vessel.

Second, it is possible to provide the transfer apparatus which may be replaced by the required test and maintenance equipment depending on working conditions.

Third, it is possible to reduce the weight and the volume of the management equipment.

Fourth, it is possible to automatically transfer the management equipment.

However, effects of the present disclosure are not limited to the foregoing matters and other effects of the present disclosure which are not mentioned may be clearly understood to those skilled in the art.

Hereinabove, the exemplary embodiments of the present disclosure are illustrated and described, but the present disclosure is not limited to the foregoing specific exemplary embodiments and therefore it is apparent that various modifications can be made to those skilled in the art without departing from the spirit of the present disclosure described in the appended claims and these various modifications should not be individually construed from the technical ideas or prospects of the present disclosure.

What is claimed is:

1. A management equipment transfer apparatus comprising:
   a cross beam configured to be disposed inside a nuclear reactor vessel and to extend in a first radial direction of the nuclear reactor vessel, the first radial direction being orthogonal to a longitudinal central line of the nuclear reactor vessel;
   a rod configured to be connected to the cross beam, disposed inside the nuclear reactor vessel, and move in an up and down direction which is parallel to the longitudinal central line of the nuclear reactor vessel;
   a bracket configured to be mounted to the rod;
   an arm configured to extend in a second radial direction of the nuclear reactor vessel toward an inner peripheral surface of the nuclear reactor vessel and be connected to the cross beam; and
   first and second rolling parts configured to be disposed at distal ends of the arm and the cross beam, contact the inner peripheral surface of the nuclear reactor vessel, and rotatably support the cross beam and the arm,
   wherein a rack disposed in the cross beam is coupled with a pinion disposed at the rod to move the bracket in the first radial direction of the nuclear reactor vessel, and
   wherein the management equipment transfer apparatus transfers management equipment inside the nuclear vessel while being locked to the management equipment and the nuclear vessel.

2. The management equipment transfer apparatus according to claim 1, wherein one or both of the arm and the cross beam are configured to extend and contract in the second and first radial directions, respectively, each of the arm and the cross beam including a cylinder and a piston so as to control an interval between a corresponding one of the first and second rolling parts and the inner peripheral surface of the nuclear reactor vessel.

3. The management equipment transfer apparatus according to claim 2, wherein the second radial direction of the arm intersects the first radial direction of the cross beam.

4. The management equipment transfer apparatus according to claim 1, wherein the rod includes a piston and a cylinder to move in the up and down direction of the nuclear reactor vessel.

5. The management equipment transfer apparatus according to claim 1, wherein the rod is coupled with the bracket by a ball screw or a lead screw to move the bracket in the up and down direction of the nuclear reactor vessel.

6. The management equipment transfer apparatus according to claim 1, wherein each of the first and second rolling parts includes:
 a roller configured to rotate by being supplied with power; and
 a wheel configured to rotate by a friction force with a locking jaw of the nuclear reactor vessel when the roller rotates, thereby causing the management equipment transfer apparatus to rotate,
 wherein the wheel is disposed to contact an upper surface of the locking jaw which is adjacent to an inner side wall, the inner side wall being formed on the inner peripheral surface of the nuclear reactor vessel by protruding from the inner peripheral surface, and
 wherein the roller is disposed to rotate by contacting the inner side wall.

7. The management equipment transfer apparatus according to claim 1, wherein the arm and the cross beam are hinged with each other to control an angle at a connection point between the arm and the cross beam.

8. The management equipment transfer apparatus according to claim 1, wherein the bracket detachably fixes the management equipment.

9. The management equipment transfer apparatus according to claim 1, further comprising:
 a first actuator configured to supply power so as to extend and contract the arm or the cross beam;
 a second actuator configured to supply power so as to move the bracket in the up and down direction of the nuclear reactor vessel; and
 a third actuator configured to supply a rotating force to the first rolling part or the second rolling part.

10. The management equipment transfer apparatus according to claim 1, wherein the management equipment includes one or both of ultrasonic testing equipment and maintenance equipment.

11. The management equipment transfer apparatus according to claim 1, wherein the nuclear reactor vessel has a cylindrical shape.

12. The management equipment transfer apparatus according to claim 1, wherein the bracket moves substantially only in the first radial direction of the nuclear reactor vessel.

13. A management equipment transfer apparatus comprising:
 a cross beam configured to be disposed inside a nuclear reactor vessel having a cylindrical shape and to extend in a first radial direction of the nuclear reactor vessel, the first radial direction being orthogonal to a longitudinal direction of the nuclear reactor vessel;
 a rod connected to the cross beam, the rod being configured to extend in an up and down direction that is parallel to the longitudinal direction of the nuclear reactor vessel;
 a bracket configured to be mounted to the rod;
 an arm configured to extend in a second radial direction of the nuclear reactor vessel, the second radial direction being orthogonal to the longitudinal direction of the nuclear reactor vessel, the arm being coupled to the cross beam; and
 first and second rolling parts configured to be disposed at distal ends of the arm and the cross beam, contact an inner side wall of the nuclear reactor vessel, and rotatably support the cross beam and the arm,
 wherein each of the first and second rolling parts includes:
  a roller configured to contact the inner side wall of the nuclear reactor vessel and move along the inner side wall in a circumferential direction of the nuclear reactor vessel; and
  a wheel configured to contact a surface of a locking jaw of the nuclear reactor vessel and move along the surface of the locking jaw in the circumferential direction of the nuclear reactor when an actuator causes the roller to move, thereby causing the management equipment transfer apparatus to rotate, and
 wherein the inner side wall is adjacent to the surface of the locking jaw and the locking jaw protrudes from the inner side wall.

14. The management equipment transfer apparatus according to claim 13, wherein the inner side wall is perpendicular to the surface of the locking jaw.

* * * * *